US007942719B2

(12) United States Patent
Leynes

(10) Patent No.: US 7,942,719 B2
(45) Date of Patent: May 17, 2011

(54) MINIATURE TOY FOR SUPPORTING DOLL ON A BICYCLE

(75) Inventor: Gary Leynes, Long Beach, CA (US)

(73) Assignee: Mattel, Inc., El Segundo, CA (US)

(*) Notice: Subject to any disclaimer, the term of this patent is extended or adjusted under 35 U.S.C. 154(b) by 38 days.

(21) Appl. No.: 12/287,033

(22) Filed: Oct. 3, 2008

(65) Prior Publication Data
US 2009/0117818 A1  May 7, 2009

Related U.S. Application Data

(60) Provisional application No. 60/997,395, filed on Oct. 3, 2007.

(51) Int. Cl.
*A63H 3/00* (2006.01)

(52) U.S. Cl. ........ 446/268; 446/279; 446/440; 446/471; 224/420; 248/689

(58) Field of Classification Search .......... 446/440, 446/228, 275, 269, 279, 268, 471, 73; D12/111, D12/114, 115; 280/288.4; 224/547, 420, 224/430, 421, 558, 411, 431; 403/289; D21/432, D21/538, 562; 248/316.7, 316.5, 346.04, 248/510, 230.6, 230.7, 231.71, 231.81, 316.1
See application file for complete search history.

(56) References Cited

U.S. PATENT DOCUMENTS

| 220,606 | A | * | 10/1879 | Goye | 446/279 |
|---|---|---|---|---|---|
| 846,695 | A | | 3/1907 | Reed | |
| 1,069,160 | A | | 8/1913 | Meltz | |
| 2,159,974 | A | | 5/1939 | Lohr | |
| 2,492,595 | A | | 12/1949 | Rhoer | |
| 2,511,169 | A | | 6/1950 | McAvoy | |
| 3,318,615 | A | | 5/1967 | Chreist, Jr. | |
| 3,516,632 | A | * | 6/1970 | Hall | 248/176.1 |
| 3,574,969 | A | | 4/1971 | Cleveland | |
| D237,641 | S | * | 11/1975 | Kato | D21/538 |
| 4,094,091 | A | * | 6/1978 | Kupperman et al. | 446/176 |
| 4,108,535 | A | | 8/1978 | Slaughter | |
| 4,120,561 | A | | 10/1978 | Burkholder | |
| 4,282,993 | A | | 8/1981 | Humlong | |
| 4,390,927 | A | * | 6/1983 | Von Feldt | 362/476 |
| 4,500,104 | A | | 2/1985 | Rudell et al. | |
| D281,964 | S | | 12/1985 | Rudell et al. | |
| D281,965 | S | | 12/1985 | Rudell et al. | |

(Continued)

FOREIGN PATENT DOCUMENTS

GB  2126489  3/1984

(Continued)

OTHER PUBLICATIONS

International Search Report for PCT/US2008/011436, dated Dec. 8, 2008, 3 pages.

*Primary Examiner* — Gene Kim
*Assistant Examiner* — Matthew B Stanczak
(74) *Attorney, Agent, or Firm* — Edell, Shapiro & Finnan, LLC

(57) ABSTRACT

A fully functional miniature toy bicycle is sized and configured to receive and support a doll in a typical riding posture. Apparatus secures the toy bicycle to the host bicycle handle bars in a releasable attachment.

44 Claims, 8 Drawing Sheets

U.S. PATENT DOCUMENTS

| | | | |
|---|---|---|---|
| 4,571,207 A | 2/1986 | Henderson et al. | |
| D291,291 S | 8/1987 | Voytko et al. | |
| 5,211,075 A | 5/1993 | Martin-Rossman | |
| 5,332,183 A | 7/1994 | Kagayama | |
| 5,735,441 A * | 4/1998 | Fujimoto | 224/420 |
| 5,845,830 A | 12/1998 | Dreiling | |
| 6,062,053 A | 5/2000 | Ho | |
| 6,176,759 B1 | 1/2001 | Trageser | |
| D445,145 S | 7/2001 | Yang | |
| 6,264,223 B1 | 7/2001 | Loewke et al. | |
| D449,860 S | 10/2001 | Lin | |
| 6,431,940 B1 | 8/2002 | Buford et al. | |
| 6,616,501 B2 | 9/2003 | Spalinski | |
| 6,729,933 B2 | 5/2004 | Hoeting et al. | |
| 6,872,117 B1 * | 3/2005 | Chen | 446/153 |
| 6,942,131 B2 * | 9/2005 | Trautman et al. | 224/414 |
| 7,077,302 B2 | 7/2006 | Chuang | |
| D530,381 S | 10/2006 | Saruhashi | |
| 7,144,024 B2 | 12/2006 | Faulkner et al. | |
| 7,191,924 B2 | 3/2007 | Kilmer | |
| 7,448,297 B2 * | 11/2008 | Tiong | 74/551.8 |
| 2002/0086609 A1 | 7/2002 | Donohoe | |
| 2003/0106919 A1 | 6/2003 | Chuang | |
| 2003/0148704 A1 | 8/2003 | Hollick | |
| 2004/0087244 A1 * | 5/2004 | Tilbor et al. | 446/268 |
| 2004/0094590 A1 | 5/2004 | Hollick | |
| 2004/0248499 A1 * | 12/2004 | Costa | 446/376 |
| 2005/0109808 A1 * | 5/2005 | Ueda | 224/420 |
| 2005/0164600 A1 * | 7/2005 | Sakai | 446/440 |
| 2007/0108244 A1 | 5/2007 | Chuang | |
| 2007/0205242 A1 | 9/2007 | Finlaw et al. | |

FOREIGN PATENT DOCUMENTS

| | | |
|---|---|---|
| JP | 9-109961 | 4/1997 |
| JP | 2004-90742 | 3/2004 |

* cited by examiner

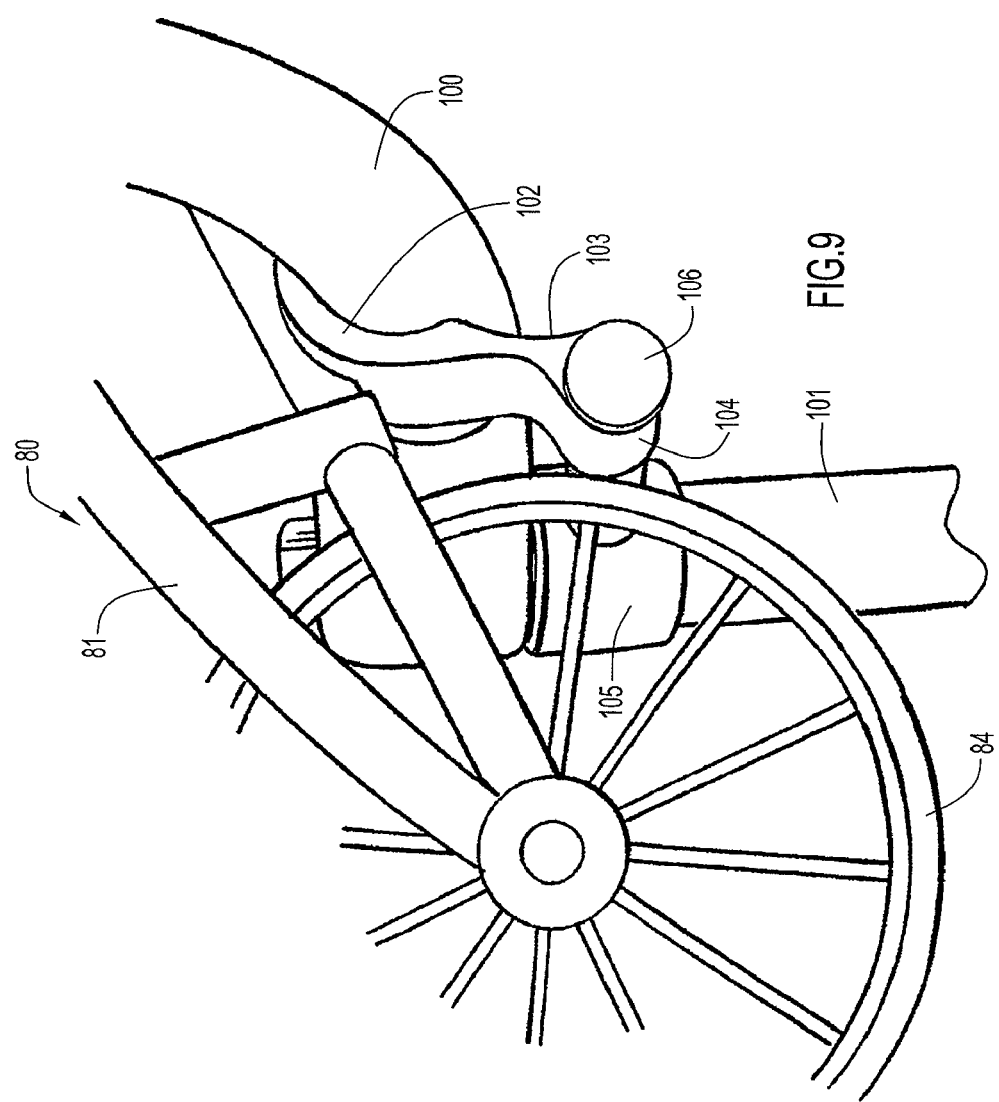

MINIATURE TOY FOR SUPPORTING DOLL ON A BICYCLE

CROSS REFERENCE TO RELATED APPLICATION

This application claims the benefit of and priority under 35 USC 119(e) of U.S. Provisional Patent Application No. 60/997,395 entitled MINIATURE TOY FOR SUPPORTING A DOLL ON A BICYCLE filed Oct. 3, 2007 in the name of Gary Leynes, the disclosure of which is incorporated herein by reference.

FIELD OF THE INVENTION

This invention relates generally to bicycles and particularly to accessory toys used in combination therewith.

BACKGROUND OF THE INVENTION

While the basic bicycle has been manufactured and sold for many years and has enjoyed popularity, practitioners in the art have sought to provide additional accessories for the basic bicycle. In attempting to provide such accessories, practitioners in the art endeavor to improve the appeal and play value of the bicycle. One family of bicycle accessories which has proven to be very popular through the years may be generally described as handle bar attachment accessories. Such accessories have included functional items such as battery-powered lights, mirrors or bells and horns. Additionally, items have been provided which are substantially nonfunctional but intended to provide aesthetic appointments for the bicycle.

For example, U.S. Pat. No. 4,108,535 issued to Slaughter sets forth a SAFETY DEVICE FOR BICYCLE suitable for mounting on bicycles which includes a pin wheel rotatable in response to air flow relative to the bicycle. The pin wheel carries a pattern of material visually perceptible from a distance which changes in appearance upon rotation of the pin wheel. A shroud surrounds the pin wheel to prevent accidental contact with the rotating pin wheel and to direct air flow against the pin wheel to enhance rotation.

U.S. Pat. No. 4,120,561 issued to Burkholder sets forth a LIGHT REFLECTIVE SIGNALING AND WARNING DEVICE which is attachable to an otherwise conventional bicycle or the like. The pin wheel-like device is positioned in the air flow passing over the moving bicycle. Air flow rotates the highly visible light reflective pin wheel device to provide visual alert to persons proximate to the moving bicycle.

Japanese patent 2004-90742 provides a spherical aesthetic and utility device configured to be attachable to the cross bar of a bicycle. The device may be styled in various appearances such as a soccer ball and the like. An internal compartment within the spherical device provides storage of articles In addition to apparatus which provides for attachment of safety or aesthetic devices on a bicycle, a similar family of devices have been provided which may be generally described as doll or passenger carrying seats or attachments. For example, U.S. Pat. No. 5,211,075 issued to Martin-Rossman sets forth a HANDLEBAR MOUNTED BIKE ACCESSORY which includes a spring mounted figurine having its torso and arms releasably engaged with a bicycle handlebar. The figurine member may be removed from the handlebar and utilized in conventional doll play.

U.S. Pat. No. 4,500,104 and Des. 281,964 both issued to Rudell et al. set forth apparatus for securing a doll receiving seat upon the handlebars of a bicycle. The seat is secured to the handlebars cross portion and the bicycle fork member and facilitates the attachment of a doll figure thereon. In addition, the lower portion the seat is in contact with the front wheel of the bicycle to provide rotational power for moving the dolls legs as the bicycle moves.

Published patent application US 2004/0094590 filed by Hollic sets forth a CHILD'S TOY CADDY for use with a conveyance such as a bicycle, tricycle or scooter. A miniature seat is configured to receive and captivate a doll and is further attachable to the handlebars of the vehicle.

U.S. Pat. No. 7,144,024 issued to Faulkner et al. sets forth a RIDE-ALONG QUICK RELEASE DOLL CARRIER AND DOLL HELMET having a doll receiving seat supported over the rear wheel of a child's bicycle. The doll is received in a forward facing position and is secured by conventional harness apparatus. The seat cooperates with a head protecting helmet for the doll.

U.S. Pat. No. 6,264,223 issued to Loewke et al. sets forth a PASSENGER CARRIER FOR BICYCLE which is receivable upon the bicycle in a manner spanning forwardly from the seat post to the front fork attachment. The seat includes a sitting portion together with a front riser and a seat back. An appropriate cushioning material is provided for the seat.

U.S. Pat. No. 5,845,830 issued to Dreiling sets forth a BICYCLE ATTACHABLE SEAT ASSEMBLY FOR CARRYING OBJECTS having a seat portion secured to a forwardly extending support member. The forwardly extending support member terminates in an attachment clamp suitable for securing the seat to a portion of a host vehicle such as a bicycle. The clamp optimally engages the seat post of the host bicycle such that the seat is positioned above the rear wheel of the bicycle.

U.S. Pat. No. 3,318,615 issued to Chreist, Jr. and Japanese patent 9-109961 both set forth early examples of toy doll carriers for use with bicycles or the like.

In a related art, a number of patents show apparatus which provide for attachment and carrying of utility articles. Thus, U.S. Pat. No. 7,191,924 issued to Kilmer sets forth a BICYCLE CELL PHONE HOLDER while published US Patent application 2003/0106919 filed by Chuang sets forth a general purpose attachment clamp for a bicycle. Similarly, Published US Patent application US 2007/0205242 filed by Finlaw et al. sets forth a SKATEBOARD CARRIER FOR BICYCLE and published US Patent application US 2007/0108244 also filed by Chuang sets forth MOUNT FOR INSTALLING ACCESSORIES ON A BICYCLE. U.S. Pat. No. 5,332,183 issued to Kagayama sets forth an ATTACHMENT APPARATUS FOR TWO-WHEELED VEHICLE PARTS FOR ENABLING HIGHLY RELIABLE ATTACHMENT suitable for general purpose use.

In a further related art, practitioners have provided a number of apparatus suitable for securing a general carryall basket to a bicycle or the like. Such devices are similar in construction and general to their relation to the present invention and include U.S. Pat. Des. 291,291 issued to Voytko et al.; U.S. Pat. No. 6,062,053 issued to Ho; U.S. Pat. No. 2,492,595 issued to Rhoer and U.S. Pat. No. 846,695 issued to Reed.

Further apparatus which relates generally as background material with respect to the present invention are set forth in U.S. Pat. No. 6,431,940 issued to Buford et al.; U.S. Pat. D530,381 issued to Saruhashi; U.S. Pat. No. 3,574,969 issued to Cleveland; U.S. Pat. No. 6,729,933 issued to Hoeting et al.; and U.S. Pat. No. 4,571,207 issued to Henderson et al.

While the foregoing prior art devices have to some extend improved the art and in some instances enjoyed commercial success, there remains nonetheless a continuing need in the art for ever more improved, interesting and play value enhancing apparatus for use with bicycles, tricycles and the like.

SUMMARY OF THE INVENTION

Accordingly, it is a general object of the present invention to provide apparatus for improving the play value of a bicycle. It is a more particular object to improve the aesthetics thereof.

In accordance with the present invention a miniature toy for supporting doll on a bicycle provides a doll-sized miniature bicycle which is fully functional in that it receives and supports a correspondingly sized doll in the posture of a rider is supported upon a bicycle. The miniature bicycle further includes apparatus for securing the doll upon the bicycle seat and securing the dolls legs and arms in a posture generally replicating a riding posture. Additionally, the miniature toy bicycle further includes a releasable clamp attachment which secures the miniature bicycle and doll supported thereon to the handle bar or neck of the bicycle. The clamp is releasable and facilitates removing the miniature toy bicycle and its doll from the bicycle handle bars or supporting neck for use in a conventional play pattern.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 9 sets forth a partial side perspective view of the neck attachment apparatus of the present invention miniature toy for supporting doll on a bicycle using a neck attachment.

DESCRIPTION OF THE PREFERRED EMBODIMENT

By way of overview, the present invention miniature toy for supporting doll on a bicycle provides a doll-sized miniature bicycle which is fully functional in that it receives and supports a correspondingly sized doll in the posture of a rider. The miniature bike further includes apparatus for securing the doll upon the bicycle seat and securing the dolls legs and arms in a posture generally replicating a riding posture. Additionally, the miniature toy bicycle further includes a releasable clamp attachment which secures the miniature bicycle and doll supported thereon to the handle bar or neck of the bicycle. The clamp is releasable and facilitates removing the miniature toy bicycle and its doll from the bicycle handle bars or supporting neck for use in a conventional play pattern.

Figure 1:
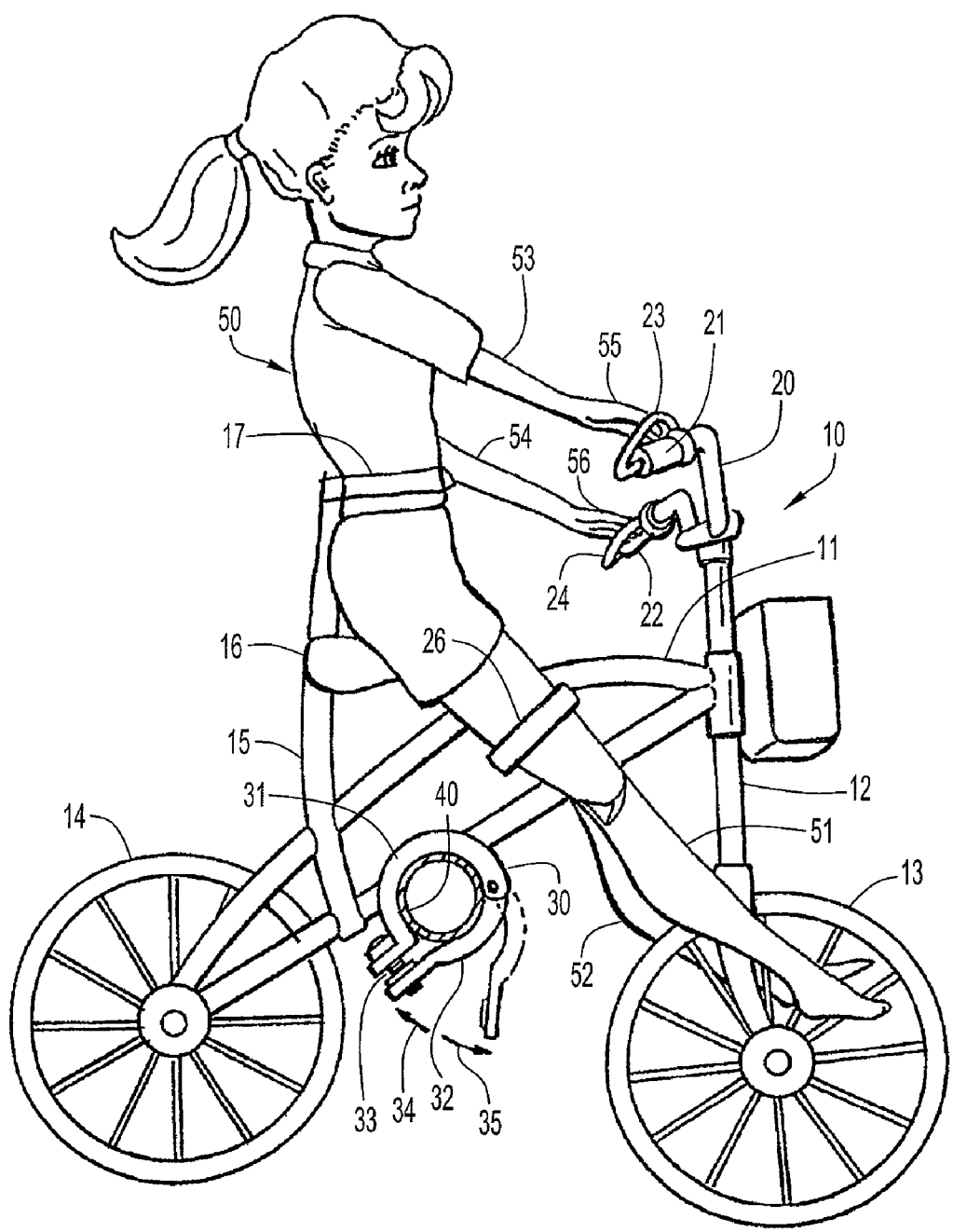
FIG. 1 sets forth a side elevation view of a miniature toy supported upon a bicycle handle and having a doll supported thereon.

FIG. 1 sets forth a side view of a miniature toy bicycle generally referenced by numeral 10 supported upon a conventional bicycle handle bar 40 by a clamp 30. As is also seen in FIG. 1, miniature toy bicycle 10 further supports a doll 50 simulating a bicycle rider.

More specifically, miniature bicycle 10 includes a frame 11 having a front fork 12 supporting a front wheel 13. Frame 11 further supports a rear wheel 14 and a portion of a clamp 30. Front fork 12 further supports a handle bar 20 having hand grips 21 and 22 together with hand loops 23 and 24. Frame 11 further supports a vertically extending seat frame 15 which supports a doll seat 16 and extends upwardly to support a waist clip 17. Frame 11 further supports a pair of leg clips such as leg clip 26.

In addition, miniature toy bicycle 10 further supports a doll 50 which is fabricated substantially in accordance with conventional fabrication techniques and which enjoys the type of articulation normally found in so-called "fashion dolls". Doll 50 is fabricated to include a pair of legs 51 and 52 as well as arms 53 and 54. Arm 53 supports a hand 55 receives within hand loop 23 while arm 54 supports a hand 56 received within hand loop 24. Waist clip 17 secures the torso portion of doll 50 upon seat 16 while a pair of leg clips such as leg clip 26 secures legs 51 and 52 to frame 11.

In the manner shown, miniature toy bicycle 10 supports doll 50 in a removable attachment whereby doll 50 may be separated from waist clip 17 and leg clips 26 to allow conventional play with doll 50.

My means set forth below in greater detail, miniature toy bicycle 10 further includes a handle bar clamp 30 and an upper jaw 31 and a hingedly coupled lower jaw 32. Jaws 31 and 32 are shown grasping the upper and lower portions of a conventional bicycle handle bar 40. A fastener 33 joins the outer portions of upper jaw 31 and lower jaw 32 to press lower jaw 32 against upper jaw 31 in the direction indicated by arrow 34. In the event the user wishes to remove clamp 30 from the host bicycle handle bar, the user simply removes fastener 33 freeing lower jaw 32 and thereafter pivoting lower jaw 32 outwardly in the direction indicated by arrow 35 to the position shown in phantom line depiction. In this manner, the entirety of miniature toy bicycle 10 and doll 50 as well as clamp 30 are removed from the host bicycle handle bar 40. It will be apparent to those skilled in the art that clamp 30 is secured to handle bar 40 by the reverse process in which clamp 30 is positioned with upper jaw 31 as shown and in which lower jaw 32 is pivoted beneath handle bar 40 in the direction indicated by arrow 34. Thereafter, fastener 33 is secured between upper jaw 31 and lower jaw 32 and tightened to a sufficient griping force. As is set forth below in FIG. 2 in greater detail, the combination of miniature toy bicycle 10 and doll 50 may be easily removed from the remainder of clamp 30 by simply pulling miniature bicycle 10 upwardly to release the snap-fit clamp securing miniature bicycle 10 to clamp 30 and thereby handle bar 40.

Figure 2:
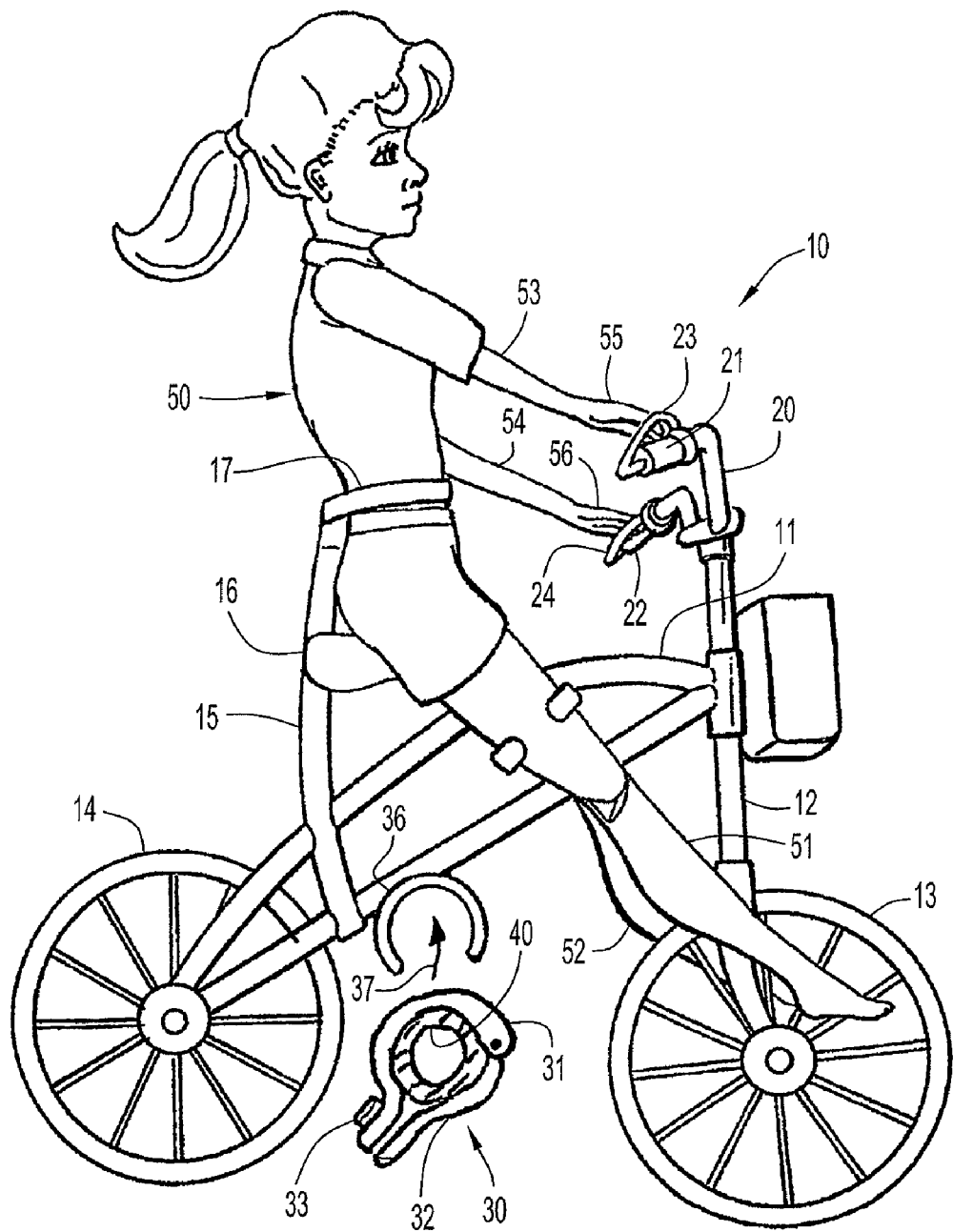
FIG. 2 sets forth a side elevation view of the miniature toy bicycle and supported doll released from the bicycle handle bars for conventional play.

FIG. 2 sets forth a side view of miniature toy bicycle 10 together with doll 50 having the combination thereof removed from clamp 30. In the figure shown in FIG. 2, the remainder of clamp 30 is secured to handle bar 40 in the manner described above. Thus, in essence, the snap-fit attachment which secures miniature toy bicycle 10 to the remainder of clamp 30 facilitates a simple removal by lifting miniature toy bicycle 10 upwardly in the direction indicated by arrow 37.

As mentioned above, FIG. 2 shows miniature toy bicycle 10 and doll 50 removed from the remainder of clamp 30. Frame 11 includes a resilient snap clasp 36 which is snap-fit attachable to the remainder of clamp 30 in the manner set forth below in FIGS. 4 and 5. Suffice it to note here, that clasp 36 is sufficient resilient being formed of substantially the same plastic material from which the remainder of frame 11 is formed such that the open ends of clasp 36 may be forced apart as clasp 36 is forced downwardly upon upper jaw 31 of clamp 30. The resilience of clasp 36 facilitates the spreading of the clasp to allow a snap-fit engagement to clamp 30. Thus, attachment of miniature bicycle 10 and doll 50 to handle bar 40 once clamp 30 is installed is facilitated by simply positioning snap clasp 36 upon the upper portion of clamp 30 and forcing it downwardly for snap-fit attachment. Conversely, miniature toy bicycle 10 and doll 50 are removed for conventional play by drawing upwardly in the direction indicated by arrow 37 again forcing the lower ends of clasp 36 to spread outwardly and releasing miniature toy bicycle 10 from clamp 30.

Figure 3:
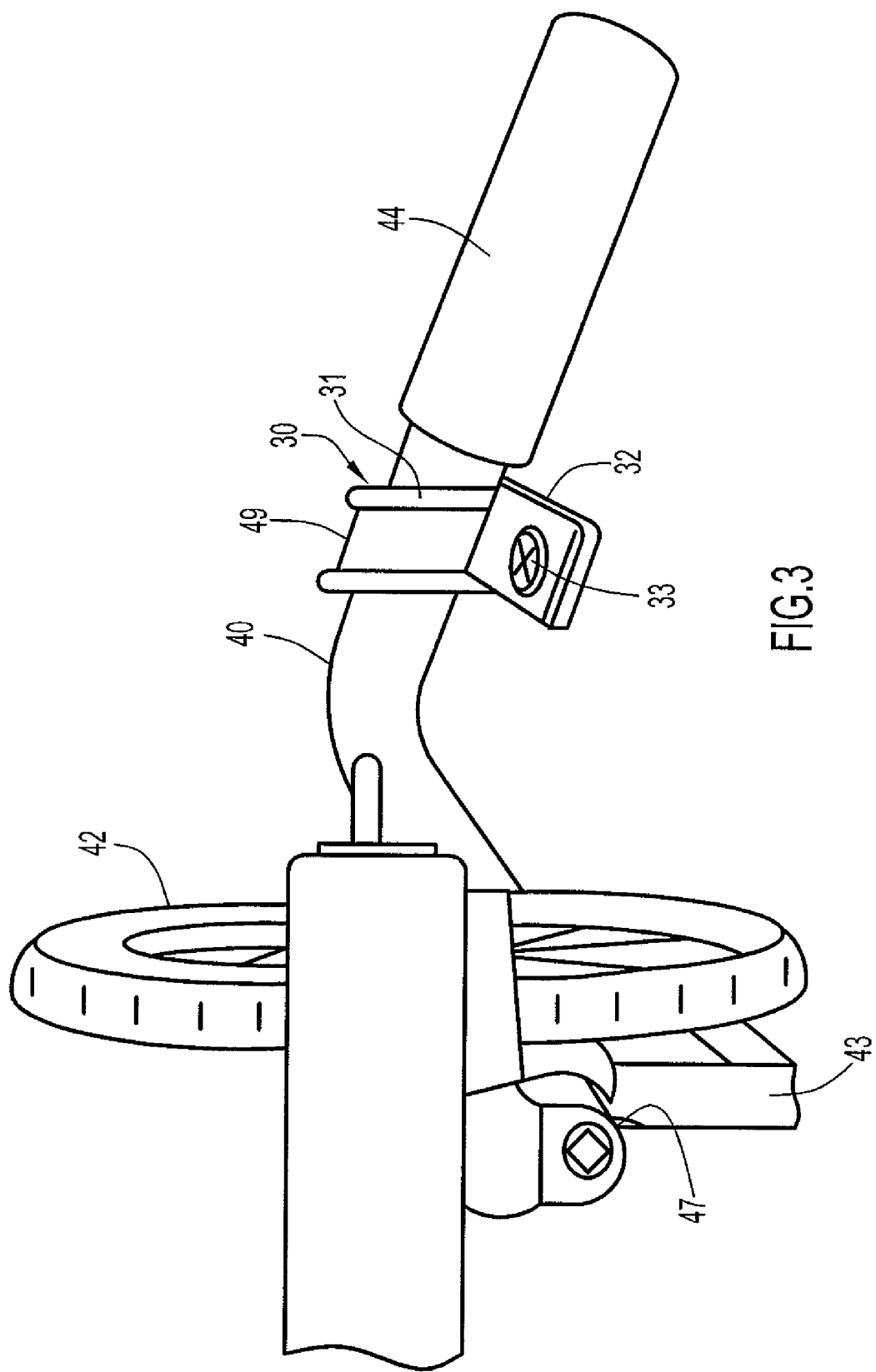
FIG. 3 sets forth a partial top perspective view of a bicycle handle bar supporting the clamp portion of the present invention toy.

FIG. 3 sets forth a partial top perspective view of a conventional bicycle having a handle bar 40 fabricated of a tubular metal material supported by a handle bar neck 41 upon a bicycle frame 43. Bicycle frame 43 supports additional conventional apparatus such as a front wheel 42. Correspondingly, handle bar 40 supports a hand grip 44. The remainder of the conventional bicycle upon which handle bar 40 is supported should be understood to be entirely conventional in fabrication.

In accordance with an important aspect of the present invention, handle bar clamp 30 described below includes an upper jaw 31 and a lower jaw 32 received upon and captivating handle bar 40. As is also described below, a fastener 33 is secured between upper jaw 31 and lower jaw 32 to provide a clamping force which secures clamp 30 upon handle bar 40. Additionally, clamp 30 defines a clasp channel 37 which receives clasp 36 (seen in FIG. 2) to provide the snap-fit attachment described above. Of importance with respect to the present invention, is the angular disposition of clamp 30 upon handle bar 40. This angled disposition facilitates a straight line attachment of upper jaw 31 and lower jaw 32 upon handle bar 40 by fastener 33 while maintaining the forward inline orientation of clasp channel 37. Correspondingly, when miniature toy bicycle 10 (seen in FIG. 1) is snap-fitted within clasp channel 37 of clamp 30, the alignment of clamp 30 correspondingly aligns miniature toy bicycle 10 in a straight line front to back orientation despite the rearward angle of handle bar 40. This maintains a realistic front to back alignment in parallel with the travel path the host bicycle enhancing the play appeal.

Figure 4:
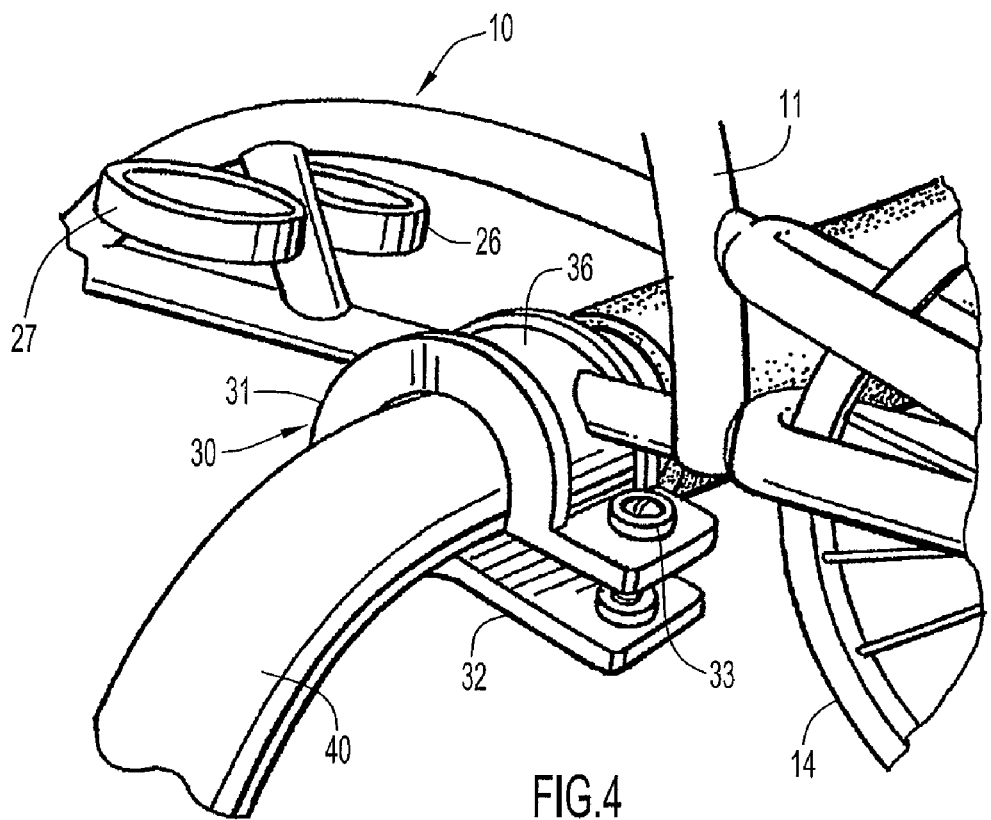
FIG. 4 sets forth a partial perspective view of the present invention miniature toy bicycle secured to its support clamp upon a bicycle handle bar.

FIG. 4 sets forth a partial perspective view of the attachment of miniature toy bicycle 10 to handle bar 40 using clamp 30. As described above, bicycle 10 includes a frame 11 supporting for example a rear wheel 14 together with a pair of leg clips 26 and 27. Additionally, and as is also described above, frame 11 further supports a downwardly open snap clasp 36 which is received upon clamp 30. Clamp 30 includes an upper jaw 31 which as is shown in FIG. 3, defines a clasp channel 37 within which snap clasp 36 is received. Clamp 30 further includes a lower jaw 32. A fastener 33 secures upper jaw 31 to lower jaw 32 to secure clamp 30 upon handle bar 40.

Figure 5:
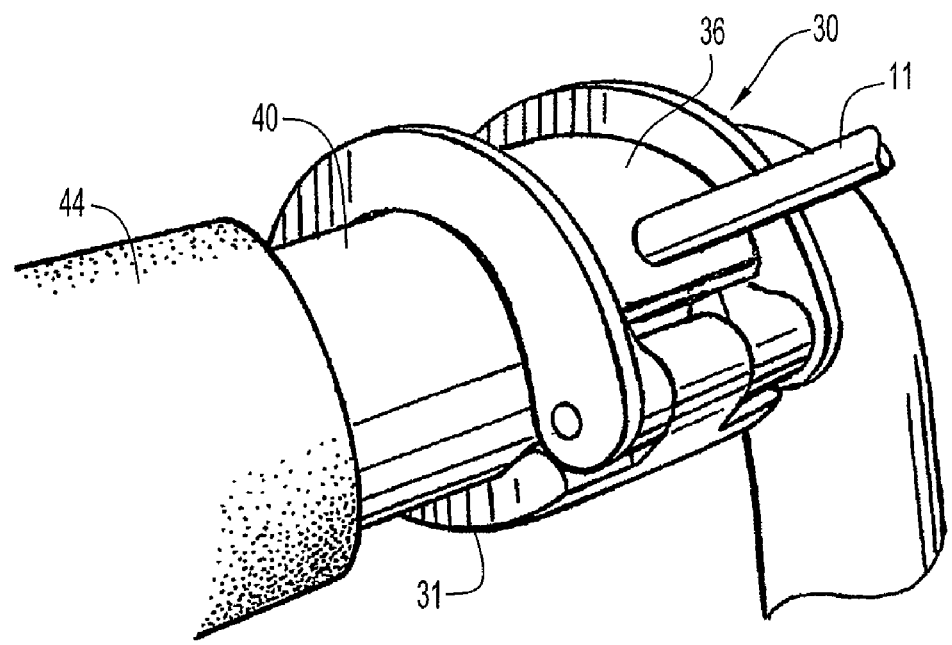
FIG. 5 sets forth a further partial perspective view of the clamp attachment of the present invention toy miniature bicycle.

FIG. 5 sets forth a partial perspective view of clamp 30 secured to handle bar 40 of a host bicycle. It will be noted that FIG. 5 is a partial perspective view from the front portion of handle bar 40. As mentioned above, handle bar 40 supports a hand grip 44 and receives clamp 30 in a secure attachment. As is also mentioned above, miniature toy bicycle 10 is secured upon handle bar 40 by the snap-fit attachment of snap clasp 36 within channel 37 (seen in FIG. 3) of clamp 30.

Figure 6:
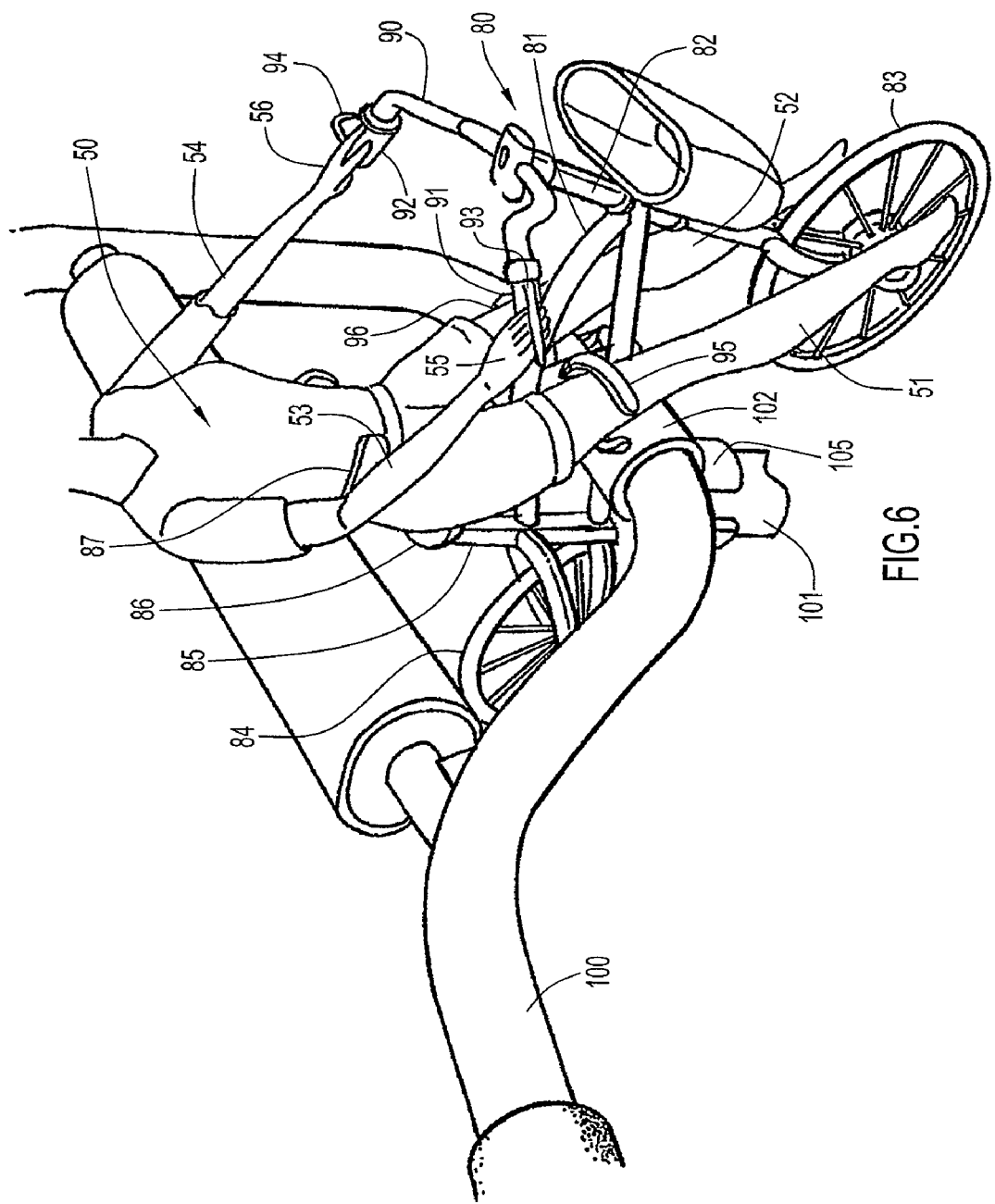
FIG. 6 sets forth a perspective view of an alternate embodiment of the present invention miniature toy for supporting doll on a bicycle having an alternative clamp arrangement secured to the neck portion of a conventional bicycle.

FIG. 6 sets forth a top perspective view of an alternate embodiment of the present invention miniature toy for supporting doll on a bicycle. It will be recognized that a substantial proportion of the miniature toy bicycle in the alternate embodiment of FIG. 6 is substantially identical to toy bicycle 10 described above. By way of overview, the primary difference between miniature toy bicycle 10 and the alternate embodiment of FIG. 6 is found in the manner by which the miniature toy bicycle is secured to the handle bars of a conventional bicycle.

More specifically, a miniature toy bicycle 80 includes a frame 81 supporting a front fork 82 which in turn supports a front wheel 83. Frame 81 further supports a rear wheel 84 and an upwardly extending seat support 85. Seat support 85 further supports a seat 86 together with a waist clip 87. Frame 81 further supports a pair of leg clips 95 and 96. Miniature toy bicycle 80 further includes a handle bar 90 having hand grips 91 and 92 on the outer ends thereof. Handle grips 91 and 92 further include hand loops 93 and 94 respectively.

A conventional doll 50 described above is supported upon seat 86 and includes a pair of legs 51 and 52 received within leg clips 95 and 96 respectively. In addition, waist clip 87 is snap fitted to the torso of doll 50. Doll 50 further includes forwardly extending arms 53 and 54 having hands 55 and 56 received within loops 93 and 94 of grips 91 and 92 respectively. Frame 81 further supports a downwardly open clasp 102 which is secured to a neck clasp 105. Neck clasp 105 and clasp 102 cooperate to secure miniature toy bicycle 80 to the handle bar neck of a conventional bicycle.

A handle bar 100 and neck 101 of a conventional bicycle receive clasp 102 and neck clasp 105 respectively in the manner described below to secure miniature toy bicycle 80 thereto. Suffice it to note here that in accordance with the play pattern set forth above in FIGS. 1 through 5, miniature toy bicycle 80 and doll 50 are snap-fit removable in the manner described below to provide separate play in a conventional play pattern apart from the host bicycle.

Figure 7:
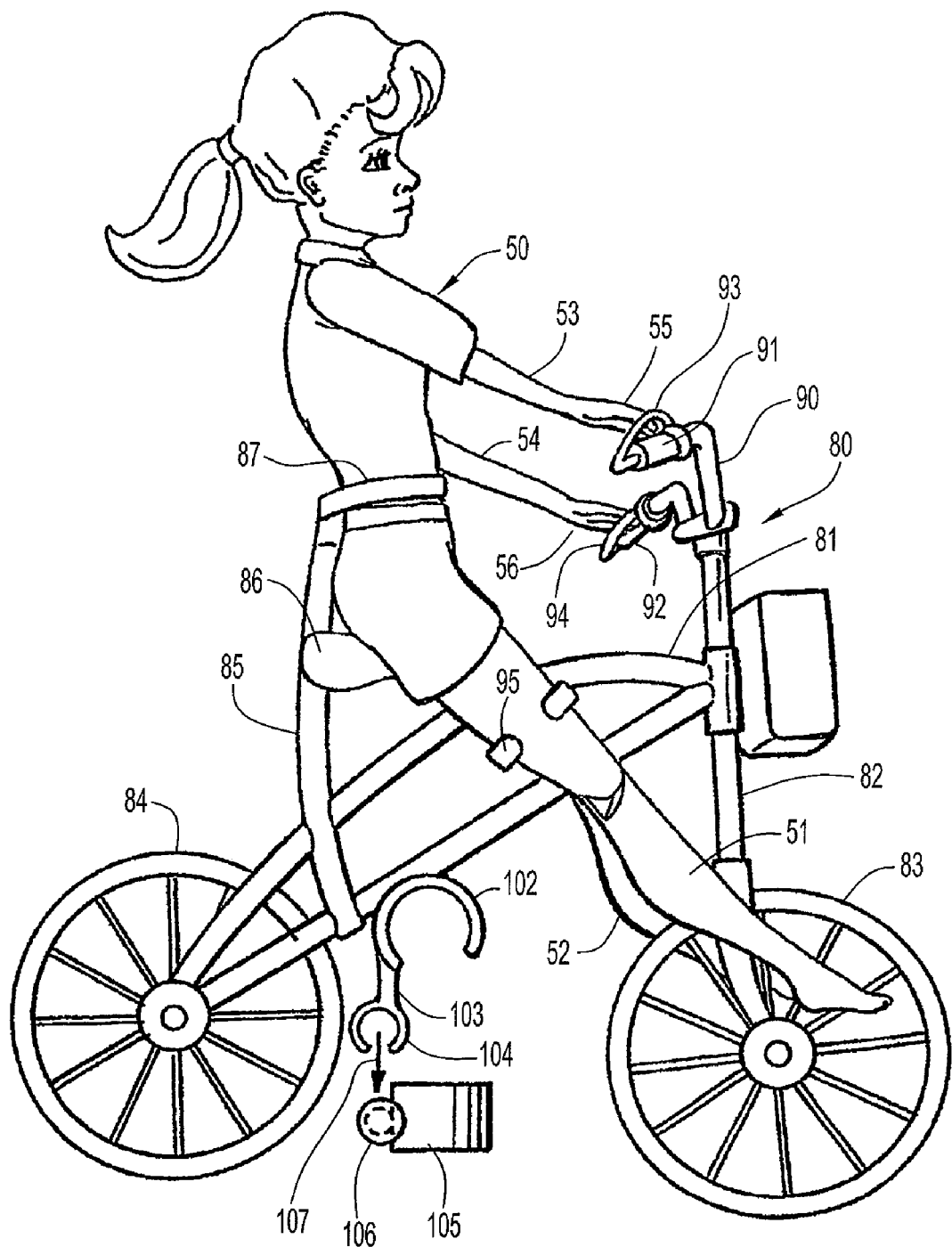
FIG. 7 sets forth a side elevation view of the embodiment of FIG. 6 showing the neck attachment clamp mechanism in assembly view.

FIG. 7 sets forth a side elevation view of the miniature toy bicycle of FIG. 6 apart from the host bicycle. FIG. 7 also shows the neck attachment apparatus of miniature toy bicycle 80 in an assembly view.

Figure 8:
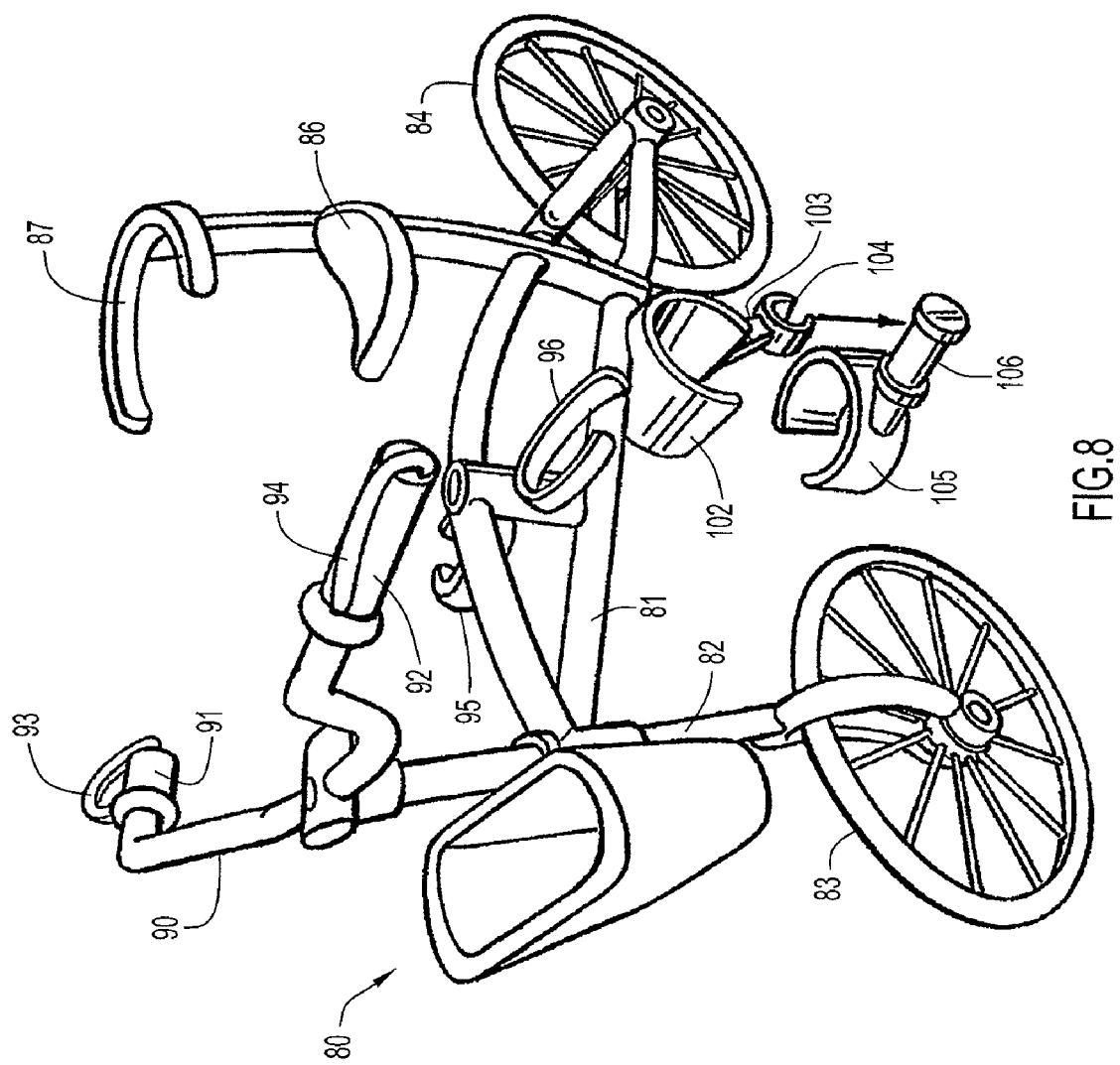
FIG. 8 sets forth a perspective view of the miniature toy of FIG. 7 showing the neck attachment in perspective view.

Clasp 102 is downwardly open and is substantially identical to clasp 36 of miniature toy bicycle 10 set forth in FIGS. 1 through 5. Thus, clasp 102 will be understood to be fabricated of a resilient plastic material and thus be snap-fit attachable to handle bar 100 (seen in FIG. 6) by a forced snap attachment. Clasp 102 differs from clasp 36 described above in that clasp 102 is intended to snap-fit upon handle bar 100 (seen in FIG. 6) directly rather that snap-fitting attachment to an intervening clamp such as clamp 30 shown in FIG. 2. By way of further variation, clasp 102 further includes a downwardly extending arm 103 which in turn supports a resilient clasp 104. A neck clasp 105 which, as is better seen in FIG. 8 is open on one side to snap-fit attach to neck 101 (seen in FIG. 6) includes a post 106. Post 106 receives clasp 104 in a snap-fit attachment as clasp 104 is forced downwardly upon post 106 in the direction indicated by arrow 107. Thus, in the assembly of miniature toy bicycle 80 to handle bar 100 (seen in FIG. 6) clasp 102 is initially forced upon handle bar 100 after which neck clasp 105 is forced upon neck 101 (also seen in FIG. 6). Thereafter, with clasp 102 and neck clasp 105 in place, clasp 104 is secured to post 106 to complete the snap-fit attachment shown in FIG. 9 in greater detail.

FIG. 8 sets forth a further perspective view of bicycle 80 having doll 50 removed therefrom. FIG. 8 also shows the handle bar and neck attachment apparatus provided by clasps 102 and 105 in an assembly view perspective.

Of importance to note in FIG. 8 is the clear illustration of the manner in which clasp 104 is received upon post 106 of neck clasp 105. As mentioned, clasp 104 is preferably formed of a resilient material such as plastic allowing it to be force fitted upon post 106 in a removable snap-fit attachment.

FIG. 9 sets forth a partial perspective view showing miniature toy bicycle 80 secured to handle bar 100 and handle bar neck 101 utilizing clasps 102 and 105 in the manner described above. Thus, as mentioned above, miniature toy bicycle 80 includes a frame 81 supporting a rear wheel 84. As is also described above, frame 81 supports a clasp 102 having an extension arm 103 which in turn supports a clasp 104. A neck clasp 105 includes a post 106. The attachment of bicycle 80 to neck 101 and handle bar 100 is accomplished by snap-fitting clasp 105 upon neck 101. Thereafter, bicycle 80 is positioned as shown to align clasp 102 with handle bar 100 and align clasp 104 with post 106. Thereafter, the combination of clasp 102 and clasp 104 is forced downwardly while clasp 105 and post 106 are held by the user. The resilient structures of clasps 102 and 104 allow snap-fit attachment thereof to handle bar 100 and post 106 respectively. At this point, miniature toy bicycle 80 is secured to handle bar 100 and neck 101. Removal of miniature toy bicycle 80 from handle bar 100 and neck 101 is accomplished by a reverse procedure in which frame 81 is drawn upwardly overcoming the retaining force of clasp 102 upon handle bar 100 and clasp 106 upon post 104. Thus, miniature toy bicycle 80 may be completely removed from the host bicycle and utilized in a conventional play pattern.

What has been shown is a novel miniature toy for supporting a doll upon a bicycle. In the example shown, the miniature toy comprises a miniature toy bicycle which supports a doll in a conventional riding posture. It will be apparent to those skilled in the art that the security of attachment provided between the miniature toy bicycle and the handle bars and handle bar necks of the host bicycle may be varied by adjusting the resilience of the cooperating clasps which secure the miniature toy bicycle to the host bicycle. In the preferred fabrication of the present invention, this attachment is selected to be very slight to facilitate easy removal within a minimum of disturbing force to accommodate the limited manual skills of a child user. In the most preferred fabrication of the present invention, this minimal attachment force provided by the cooperating clasp attachments of the miniature toy bicycle is selected to allow the child user to remove the miniature toy bicycle easily by simply pushing a hand against the toy bicycle thereby disturbing the clasps and releasing the toy bicycle. The entire miniature toy bicycle set forth herein is readily fabricated of a simple molded plastic material or the like and is suitable for high volume mass production typical of such toys.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A toy for supporting a doll upon a host vehicle having a handlebar, said toy comprising:
   a clamp securable to the handlebar of the host vehicle, the clamp defining a channel;
   a miniature toy bicycle having a frame and a clasp coupled to a portion of the frame, the clasp being removably mountable to the clamp to secure the toy bicycle to the host vehicle, the clasp being snap-fit onto the clamp and located within the channel of the clamp when the toy bicycle is mounted on the host vehicle; and
   doll-receiving means for removably securing a doll to said miniature toy bicycle in a riding posture, the means for removably securing a doll being formed on the toy bicycle.

2. The toy set forth in claim 1, wherein the clamp includes:
   first and second hinged jaws shaped to grasp a portion of the host vehicle's handlebar; and
   a fastener securing said jaws in a closed position.

3. The toy set forth in claim 2, wherein said doll-receiving means for removably securing a doll includes:
   a seat having a flexible waist clamp for grasping a doll;
   a pair of thigh clips extending from said toy bicycle to engage the doll's legs; and
   a pair of hand receptacles supported upon the miniature toy bicycle's handlebar to receive a portion of the doll's hands.

4. The toy set forth in claim 3, wherein the host vehicle is a bicycle rideable by a child, and the channel of said clamp is oriented in a forward orientation when the clamp is on said host vehicle's handlebar to align said toy bicycle with the forward direction of the bicycle.

5. The toy set forth in claim 4, wherein the clasp is downwardly facing and extends downwardly from said toy bicycle to engage said clamp.

6. The toy set forth in claim 5, wherein the clasp is a resilient c-shaped clasp that snaps onto the clamp.

7. The toy set forth in claim 1, wherein the means for removably securing a doll includes at least one thigh clip extending outwardly from a side of the toy bicycle, the at least one thigh clip receiving one of the doll's legs.

8. The toy set forth in claim 1, wherein the means for removably securing a doll includes at least one hand receptacle defined by a loop formed by a portion of the handlebar of the toy bicycle.

9. The toy set forth in claim 1, wherein the channel of the clamp is oriented in a forward orientation when the clamp is mounted to the host vehicle's handlebar.

10. The toy set forth in claim 1, wherein the clamp remains mounted to the host vehicle's handlebar when the clasp is removed from the clamp.

11. A toy bicycle configured to be used with a host bicycle having a handlebar, the toy bicycle comprising:
    a frame;
    support components coupled to the frame, the support components mounting a doll on the toy bicycle in a riding posture, the support components receiving at least two different body parts of the doll at different locations on the toy bicycle;
    a clamp mountable on the handlebar of the host bicycle; and
    a coupler coupled to the frame, the coupler being a resilient clasp that is slidable onto the clamp when the clamp is mounted to the handlebar of the host bicycle to couple the toy bicycle to the handlebar of the host bicycle, the coupler surrounding a portion of the clamp.

12. The toy bicycle of claim 11, wherein the support components include a waist receiving member that is coupleable to a waist of the doll, at least one leg receiving member that receives a leg of the doll, and at least one hand receiving member that receives a hand of the doll.

13. The toy bicycle of claim 12, wherein the waist receiving member is a clip that receives the waist of the doll, and the at least one leg receiving member is a clip that receives the leg of the doll.

14. The toy bicycle of claim 11, wherein the clamp includes a channel that receives the resilient clasp, the channel extending along a forward direction of the host bicycle so that the resilient clasp and the toy bicycle are oriented along the forward direction when the toy bicycle is mounted to the host bicycle.

15. The toy bicycle of claim 11, wherein the clamp can remain coupled to the host bicycle when the resilient clasp is removed from the clamp and the toy bicycle is removed from the host bicycle.

16. The toy bicycle of claim 15, wherein the clamp includes a first jaw and a second jaw hingedly coupled to the first jaw, an outer portion of the first jaw is coupleable to an outer portion of the second jaw via a fastener, and each of the first jaw and the second jaw including a channel formed therein, the channels being configured to receive the resilient clasp.

17. A bicycle assembly, comprising:
   a clamp securable onto a handlebar of a host bicycle, the clamp defining a channel; and
   a toy bicycle configured to be used with the host bicycle, and a doll having a torso portion, a first leg, and a second leg, the toy bicycle including:
      a frame;
      a plurality of supports coupled to the frame and configured to mount the doll on the toy bicycle, the supports including a first support configured to receive the torso portion of the doll, a second support configured to receive the first leg of the doll, and a third support configured to receive the second leg of the doll; and
      a coupler coupled to the frame, the coupler being a resilient clasp that is mountable onto the clamp secured to the handlebar of the host bicycle to couple the toy bicycle to the host bicycle, the clasp being configured to snap onto the clamp and be located in the channel.

18. The bicycle assembly of claim 17, wherein the first support is a clip that receives the torso portion of the doll, and the second support extends from an opposite side of frame from the third support, each of the second support and the third support being a clip that surrounds a portion of the corresponding leg of the doll.

19. The bicycle assembly of claim 18, wherein the second support engages a thigh portion of the first leg, and the third support engages a thigh portion of the second leg.

20. The bicycle assembly of claim 17, wherein the first support is snapped onto the torso portion of the doll.

21. The bicycle assembly of claim 17, wherein the doll includes a first hand and a second hand, the plurality of supports includes a fourth support and a fifth support, the fourth support is configured to couple the first hand to the frame, and the fifth support is configured to couple the second hand to the frame.

22. The bicycle assembly of claim 17, further comprising: the host vehicle.

23. A bicycle assembly, comprising:
   a toy bicycle configured to be used with a host bicycle having a handlebar, and a doll with a torso portion, a first hand, a second hand, a first leg, and a second leg, the toy bicycle including:
      a frame;
      means for removably securing the first leg of the doll to the frame;
      means for removably securing the second leg of the doll to the frame;
      means for removably securing the torso portion of the doll to the frame; and
      means for removably securing the frame to a clamp that is mounted on the handlebar of the host bicycle to mount the toy bicycle to the handlebar of the host bicycle, the clamp defines a channel, and the means for removably securing the frame includes a resilient clasp that snaps onto the clamp and engages the channel of the clamp.

24. The toy bicycle of claim 23, wherein the means for removably securing the first leg receives a portion of the first leg, the means for removably securing the second leg receives a portion of the second leg, and the means for removably securing the torso portion receives the torso portion of the doll.

25. The toy bicycle of claim 23, wherein the frame of the toy bicycle includes a handlebar, the toy bicycle further comprising:
   means for removably securing the first hand and the second hand of the doll to the frame of the toy bicycle.

26. The bicycle assembly of claim 23, wherein the clamp remains mounted on the handlebar of the host bicycle when the means for removably securing the frame is disengaged from the clamp.

27. The bicycle assembly of claim 23, wherein the channel is configured to be aligned with a travel path of the host bicycle so that the toy bicycle is aligned with the travel path.

28. The bicycle assembly of claim 23, further comprising: the host bicycle.

29. A bicycle assembly, comprising:
   a toy bicycle configured to be used with a host bicycle having a handlebar and a clamp mounted to the handlebar, the toy bicycle including:
      a frame having a first side and a second side opposite to the first side, the frame including a resilient clasp extending from a portion of the frame, the resilient clasp being mountable onto the clamp on the handlebar in a snap-fit arrangement;
      a first clip coupled to the frame, the first clip configured to receive a torso portion of a doll to couple the torso portion to the frame;
      a second clip coupled to the frame and extending from the first side of the frame, the second clip configured to receive a portion of a first leg of the doll to couple the first leg of the doll to the frame; and
      a third clip coupled to the frame and extending from the second side of the frame, the third clip configured to receive a portion of a second leg of the doll to couple the second leg of the doll to the frame.

30. The bicycle assembly of claim 29, wherein the frame includes a seat and the first clip extends upwardly from the seat.

31. The bicycle assembly of claim 29, wherein the second clip extends around a thigh portion of the first leg, and the third clip extends around a thigh portion of the second leg.

32. The bicycle assembly of claim 29, further comprising: the host vehicle.

33. A toy for use with a host vehicle, the host vehicle including a handlebar, the toy comprising:
   a clamp securable to the handlebar of the host vehicle, the clamp defining a channel; and
   a miniature toy bicycle having a frame and at least one member that can secure a toy doll to the frame, the frame including a clasp coupled to a portion of the frame, the clasp being removably mountable to the clamp to mount toy bicycle onto the handlebar of the host vehicle, the clasp being snap-fit onto the clamp and located within the channel of the clamp when the toy bicycle is mounted on the host vehicle.

34. The toy of claim 33, wherein the clasp channel is formed on an outer surface of the clamp, and the clasp can be placed in contact with the outer surface of the clamp.

35. The toy of claim 33, wherein the clamp includes a first jaw and a second jaw, the second jaw is movable between an open position and a closed position relative to the first jaw, one end of the second jaw is pivotally coupled to the first jaw by a first connector, and another end of the second jaw is secured to the first jaw by a second connector.

36. The toy of claim 35, wherein the clasp includes a pair of spaced apart ends, the ends being positioned in engagement with the second jaw and the channel of the clamp, the ends spreading apart from each other as a downward force is applied to the frame of the toy bicycle.

37. The toy of claim 33, wherein the clasp can be slid onto the clamp to mount the toy bicycle to the handlebar, and the clasp can be slid off of the clamp to remove the toy bicycle from the handlebar, the clamp remaining coupled to the handlebar when the clasp is slid off of the clamp.

38. The toy of claim 33, wherein the frame of the toy bicycle includes first and second wheels rotatably mounted thereto, the clasp is coupled to the frame at a location between the wheels, and the clasp extends downwardly relative to the frame of the toy bicycle.

39. The toy of claim 33, wherein the clasp is a resilient snap clasp that has a generally curved configuration and a pair of spaced apart ends, the ends of the clasp being forced apart as the clasp is slid onto the clamp within the channel of the clamp.

40. The toy of claim 33, further comprising:
the doll.

41. A toy bicycle configured to be used with a host bicycle having a handlebar, the toy bicycle comprising:
a frame;
support components coupled to the frame, the support components mounting a doll on the toy bicycle in a riding posture, the support components receiving at least two different body parts of the doll at different locations on the toy bicycle;
a clamp mountable on the handlebar of the host bicycle, the clamp including a first jaw and a second jaw hingedly coupled to the first jaw, a portion of the first jaw is coupleable to a portion of the second jaw via a fastener, each of the first jaw and the second jaw including a channel formed therein; and
a coupler coupled to the frame, the coupler being a resilient clasp that is slidable onto the clamp when the clamp is mounted to the handlebar of the host bicycle to couple the toy bicycle to the handlebar of the host bicycle.

42. The toy bicycle of claim 41, wherein the channels of the first jaw and second jaw receive the resilient clasp when the clasp is coupled to the clamp, the channels extending along a forward direction of the host bicycle so that the resilient clasp and the toy bicycle are oriented along the forward direction when the toy bicycle is mounted to the host bicycle.

43. The toy bicycle of claim 41, wherein the clamp can remain coupled to the host bicycle when the resilient clasp is removed from the clamp and the toy bicycle is removed from the host bicycle.

44. The toy of claim 41, further comprising:
the doll.

* * * * *